US008118321B2

(12) United States Patent
Hunziker et al.

(10) Patent No.: US 8,118,321 B2
(45) Date of Patent: Feb. 21, 2012

(54) VEHICLE WITH CENTRAL WHEEL DRIVE, IN PARTICULAR A WHEELCHAIR OR STAND-UP WHEELCHAIR

(75) Inventors: Kurt Hunziker, Steffisburg (CH); Thomas Raber, Muri (CH)

(73) Assignee: Levo Wohlen, Wohlen (CH)

( * ) Notice: Subject to any disclaimer, the term of this patent is extended or adjusted under 35 U.S.C. 154(b) by 243 days.

(21) Appl. No.: 12/674,845

(22) PCT Filed: Mar. 20, 2008

(86) PCT No.: PCT/CH2008/000126

§ 371 (c)(1),
(2), (4) Date: Feb. 23, 2010

(87) PCT Pub. No.: WO2009/026731

PCT Pub. Date: Mar. 5, 2009

(65) Prior Publication Data

US 2011/0215540 A1 Sep. 8, 2011

(30) Foreign Application Priority Data

Aug. 24, 2007 (CH) ........................................ 1327/07

(51) Int. Cl.
*B62M 1/14* (2006.01)

(52) U.S. Cl. ............... 280/250.1; 280/304.1; 280/304.2; 280/755; 180/907

(58) Field of Classification Search ............... 280/250.1, 280/304.1, 304.2, 755; 180/907
See application file for complete search history.

(56) References Cited

U.S. PATENT DOCUMENTS

| | | | | |
|---|---|---|---|---|
| 5,904,214 | A | 5/1999 | Lin | |
| 5,964,473 | A | 10/1999 | Degonda | |
| 5,996,716 | A | 12/1999 | Montiglio | |
| 7,219,924 | B2 * | 5/2007 | Mulhern et al. | 280/755 |
| 7,389,835 | B2 * | 6/2008 | Mulhern et al. | 180/22 |
| 7,413,038 | B2 * | 8/2008 | Mulhern et al. | 180/22 |
| 7,490,683 | B2 * | 2/2009 | Schaffner | 180/65.1 |
| 7,516,984 | B2 * | 4/2009 | Tang | 280/755 |
| 7,766,106 | B2 * | 8/2010 | Puskar-Pasewicz et al. | 180/65.1 |
| 7,775,307 | B2 * | 8/2010 | Cheng | 180/22 |
| 7,882,909 | B2 * | 2/2011 | Pearlman et al. | 180/23 |
| 7,931,300 | B2 * | 4/2011 | Mulhern et al. | 280/755 |
| 2007/0152427 | A1 | 7/2007 | Olsen | |

FOREIGN PATENT DOCUMENTS

DE 198 16 879 10/1999

(Continued)

*Primary Examiner* — Toan To

(74) *Attorney, Agent, or Firm* — Morris O'Bryant Compagni, P.C.

(57) ABSTRACT

The vehicle, for example a stand-up wheelchair, comprises a frame (11) and, arranged on the latter, a seat device (19). On each side of the frame (11), the central wheel (13), which can be driven by a motor (27), and the front wheel (15) are operatively connected to each other by an endless chain (45). The frame (11) has a front part (21) and a rear part (23), which are connected to each other in an articulated manner by way of a joint (25). In the sitting position, the front wheels (15) are not in contact with the ground, which means that they do not obstruct the manoeuvring of the vehicle in a confined space. In the standing position, the front wheels (15) are in contact with the ground, but the central wheels (13) are not. The user, in the standing position, is thus able to turn about the axis of the vehicle, without the central wheels (13) having a blocking action.

12 Claims, 4 Drawing Sheets

FOREIGN PATENT DOCUMENTS

| | | |
|---|---|---|
| GB | 2 325 903 | 12/1998 |
| WO | 00/08910 | 2/2000 |
| WO | 2005/051279 | 6/2005 |
| WO | 2006/136046 | 12/2006 |

* cited by examiner

VEHICLE WITH CENTRAL WHEEL DRIVE, IN PARTICULAR A WHEELCHAIR OR STAND-UP WHEELCHAIR

CROSS-REFERENCE TO RELATED APPLICATIONS

This application claims priority to Swiss Patent Application CH1327/07 filed on Aug. 24, 2007, and PCT Application PCT/CH2008/000126 filed on Mar. 20, 2008, the entirety of each of which are incorporated by this reference.

BACKGROUND OF THE INVENTION

1. Field of the Invention

The invention relates to a vehicle with central wheel drive, in particular a wheelchair or stand-up wheelchair, with a chassis and a seat device arranged on the chassis, the chassis having a front part and a rear part which are connected to each other in an articulated manner by means of a joint, and also two central wheels which can be motor-driven separately from each other, two front wheels and at least one rear wheel.

2. State of the Art

U.S. Pat. No. 5,904,214 discloses a wheelchair with central wheel drive with two central wheels, two front wheels in the form of pivot wheels and a rear wheel. The seat is arranged over the central wheels. Each of the two central wheels can be driven separately by a motor. This has the advantage that the wheelchair can be turned in a narrow space, for example in an elevator car. In order in this way to turn on site, the user of the wheelchair actuates the controller in such a way that the two central wheels are rotated in mutually opposite directions. This turns the user, along with the wheelchair, about his or her own axis. The front wheels may not obstruct turning. This is why the front wheels are in the form of pivot wheels. This wheelchair has the drawback that the front wheels have to be in the form of pivot wheels in order not to obstruct turning. There is therefore little space for the footrest. A particular drawback of this wheelchair is the fact that it is not possible, when travelling slowly, to surmount obstacles exceeding a certain height.

A six-wheeled wheelchair, in which a two-armed lever is articulated by means of a joint on each side of the chassis, has become known from WO 2005/051279. A wheel is arranged on each lever arm. The wheels of this pair of wheels are coupled to each other by a chain or a toothed gearing and can be jointly driven by a motor. The arrangement of the two pairs of wheels and the rear wheels is selected in such a way that the weight of the user of the chair is distributed roughly uniformly onto the pairs of wheels and the rear wheels. From the point of view of their function, the aforementioned pairs of wheels are thus front wheels. The articulated arrangement of the two-armed lever on the chassis ensures that both wheels of the pairs of wheels remain in contact with the ground at all times, even when travelling on uneven terrain. This wheelchair does not have the advantages of the wheelchair with central drive as described hereinbefore. It is not possible to turn on site.

Vehicles with central drive, in particular wheelchairs, should also be able to surmount obstacles. When the front wheel of a vehicle strikes an obstacle, for example the edge of a kerb, two force components become active: a first force components extending parallel and counter to the direction of travel and a second force component which is directed upward, perpendicularly to the direction of travel. The higher the edge to be surmounted of the obstacle, the greater the first force component becomes. The necessary drive force must thus be all the greater in order to be able to surmount the obstacle. If the motor power is relatively low, the obstacle cannot be surmounted when travelling slowly. In order to be able to surmount the obstacle even when travelling slowly, the diameter of the front wheel can be increased in size. However, this is usually undesirable, either because there is little available space or on account of the undesirable increase in weight associated therewith.

U.S. Pat. No. 5,964,473 proposes providing before the front wheel a further wheel, known as a lift wheel. The lift wheel is arranged in a somewhat raised manner and is thus not normally in contact with the ground. When surmounting an obstacle, the lift wheel firstly strikes the obstacle and lifts the front of the chassis somewhat upward and in this way makes it easier for the front wheel to surmount the obstacle. However, the fact that the use of lift wheels makes the wheelchair more expensive is disadvantageous.

The surmounting of obstacles and the travelling behaviour of the vehicle, for example on snow-covered carriageways, can be improved if not only the central wheels, but also the front and/or rear wheels are motor-drivable. Thus, for example, U.S. Pat. No. 5,904,214 provides motor-drivable rear wheels. WO 2006/136046 discloses a wheelchair in which a central wheel, a front and/or rear wheel is arranged on each side, an endless chain serving as the common drive for these wheels. The wheelchair described therein requires special pivot wheels having at least one spring joint. This increases the manufacturing costs of the wheelchair.

The wheelchairs described hereinbefore according to U.S. Pat. No. 5,904,214, U.S. Pat. No. 5,964,473 and WO 2006/136046 all have the advantage mentioned at the outset of being able to turn in a narrow space. However, these wheelchairs are not stand-up wheelchairs and therefore permit only a person sitting down, but not a person standing up, to carry out a rotation about his own axis.

DE 198 16 879 describes a stair-climbing wheelchair with a combined wheel and crawler drive having four rotatable and pivotable pivot arms. In contrast to wheelchairs with central wheel drive, the described wheelchair is of much more complex design and does not allow turning in a very narrow space.

The wheelchair according to US 2007/0152427 is not a wheelchair with central wheel drive either. This wheelchair has in principle four or eight articulated wheel units, the wheels of which can be individually motor-driven.

WO 2005/051279 describes an electric wheelchair having a frame, arranged on the front of which are two drive shafts which can be driven by electric motors. Each drive shaft drives two successively arranged front wheels via a gear mechanism. Two rear wheels are also provided. The description expressly refers to pairs of front wheels arranged in-line. There is thus no wheelchair with central wheel drive. It is thus also not possible to turn the wheelchair described in a narrow space by way of rotation of central wheels in mutually opposite directions.

GB 2 325 903 discloses a vehicle with a chassis having a front part and a rear part which are connected to each other in an articulated manner by means of a joint. The front wheels and the central wheels, which can be driven by a four wheel drive with one or more motors, are arranged on the front part. On flat ground, both the front and the rear wheels are in contact with the ground; this has the drawback that it is not possible to turn in a narrow space, because the non-steerable front wheels prevent this. It is also almost impossible to surmount an obstacle when travelling forward without a run-up. Instead, reversing is expressly prescribed in order to surmount the obstacle (page 7, lines 2 ff.). In order to allow an obstacle to be surmounted, the rear wheels are arranged in a raised manner. They are not normally in contact with the ground. A sensor is also provided that can be used to control an actuator which pivots the front part in relation to the rear part in order to raise a pair of auxiliary wheels by means of a lifting system so that the pair of auxiliary wheels can easily surmount the obstacle. For the same purpose, the pivoting of the rear part also causes raising of the central wheels. This design is complex and expensive and has, apart from the aforementioned drawback of turning in a narrow space being impossible, the further drawback that a relatively large obstacle can be surmounted only when reversing.

It is an advantage of the present invention to provide a vehicle with central wheel drive, in particular a wheelchair or stand-up wheelchair, which is able to surmount relatively large obstacles even at relatively low speed, has good travelling properties even, for example, on a snow-covered carriageway, but still has the advantages of central wheel drive, including in particular the capacity to turn in a narrow space. A stand-up wheelchair should enable the user to perform a rotation about his or her own axis both in the sitting position and in the standing position.

SUMMARY OF THE INVENTION

According to the invention, a vehicle of the type mentioned at the outset is characterised in that the front wheels can be motor-driven separately from each other and in that drive means are provided allowing the front part of the chassis to be adjusted in relation to the rear part in order to bring the central wheels out of contact with the ground. They therefore do not prevent the user of the vehicle, when sitting down, from rotating, together with the vehicle, about his own axis. However, the invention also permits the user to perform, when standing up, a rotation about his own axis, since the front part of the chassis can be adjusted by means of the aforementioned drive means in order to bring the central wheels out of contact with the ground. Because the front wheels can be driven separately from each other, they can be driven, like the central wheels too, in mutually opposite directions, so that the user is rotated, when standing up, about his or her own axis. As the central wheels are not in contact with the ground, they do not obstruct a rotation of this type. The design according to the invention of the vehicle has the further advantage of being relatively simple while still ensuring good travelling properties. In contrast to the wheelchair according to GB 2 325 903, an obstacle can be surmounted when travelling forward. Owing to the fact that the front wheels are not normally in contact with the ground, i.e. are arranged in a raised position, when they strike an obstacle, they can also easily surmount it. Because, furthermore, the front wheels do not have to be in the form of pivot wheels, there is plenty of room for the footrest. As central wheels and front wheels are motor-drivable, the wheelchair behaves, for example on a snow-covered carriageway, like a vehicle with four wheel drive. Indeed, there are also four driven wheels. Although the rear wheel does not have a motor drive, this does not have an adverse effect on the travelling behaviour because, in a vehicle with central wheel drive, the user's weight loads mainly the central wheels. In an advantageous embodiment of the invention, the front part forms a two-armed lever, the central wheels being arranged on one arm and the front wheels being arranged on the other arm. Spring means, for example a spring joint element or a spring, can be provided to hold the front wheels normally out of contact with the ground. In this raised position, the front wheels facilitate the surmounting of obstacles. In order to be able to easily surmount obstacles when reversing too, an auxiliary wheel can be provided after the central wheel. For reasons of cost, it is advantageous to provide a common motor drive, generally an electric motor, for the central wheel, the front wheel and if appropriate for the auxiliary wheel. The central wheel, the front wheel and if appropriate the auxiliary wheel can be operatively connected to one another by an endless chain, an endless toothed belt, a toothed gearing, a cardan shaft or another device.

A motor which can be actuated by the user, for example a linear motor, can serve as the drive means for adjusting the front part. For reasons of cost, a motor of this type can be dispensed with in a stand-up wheelchair. Instead, it is sufficient to couple, for example by connecting means, for example a Bowden wire or a cable pull, the stand-up mechanism of the stand-up chair to the front part of the chassis. This coupling then causes the front part of the chassis to be lowered during a transition from the sitting position to the standing position, so that the front wheels enter into contact with the ground and the central wheels are brought out of contact with the ground. However, in wheelchairs and stand-up wheelchairs, other mechanical means are also conceivable for the same purpose, for example ones actuated by the user of the chair. In this position of the wheels, the user of the wheelchair can turn, when standing up, together with the stand-up wheelchair, about his or her own axis without the central wheels obstructing this.

BRIEF DESCRIPTION OF THE DRAWINGS

Exemplary embodiments will now be described with reference to the drawings, in which.

DETAILED DESCRIPTION OF THE ILLUSTRATED EMBODIMENTS

Figure 1:
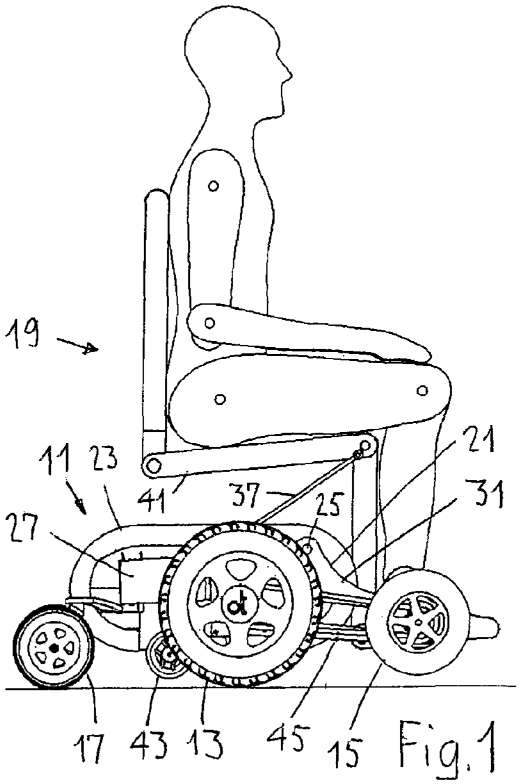
FIG. 1 shows a stand-up wheelchair.
Figure 5:
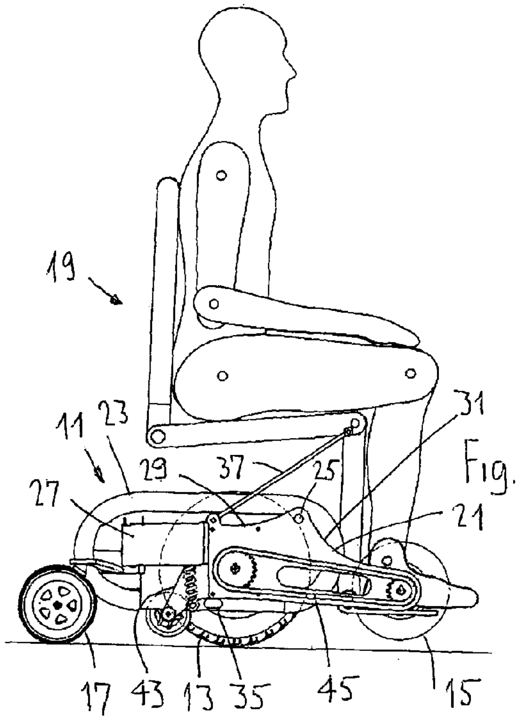
FIG. 5 shows the stand-up wheelchair from FIG. 1 in the sitting position.

The vehicle illustrated in FIG. 1 is in the form of a stand-up wheelchair. The stand-up wheelchair consists substantially of the chassis 11, comprising the wheels 13, 15, 17, and the seat device 19. The seat device is provided with a stand-up mechanism (not shown) allowing the user to move from the sitting position illustrated in FIGS. 1 and 5 to the standing position illustrated in FIGS. 6 and 7. The sitting device is arranged in such a way that the weight of the user of the chair loads, in the sitting position, substantially the central wheels and, in the standing position, the front wheels. Stand-up mechanisms have long been known. A stand-up unit such as is described in Swiss patent application No. 1132/07 has proven to be particularly advantageous. However, as will be discussed hereinafter in greater detail, the chassis 11 can also be combined with a sitting device which is conventional for normal wheelchairs. Finally, the vehicle can also be embodied for other purposes, for example as a golf cart.

Figure 3:
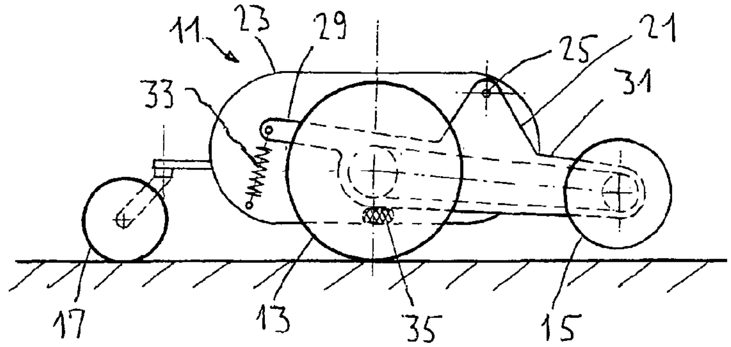
FIG. 3 is a schematic illustration of a first embodiment of the chassis.
Figure 4:
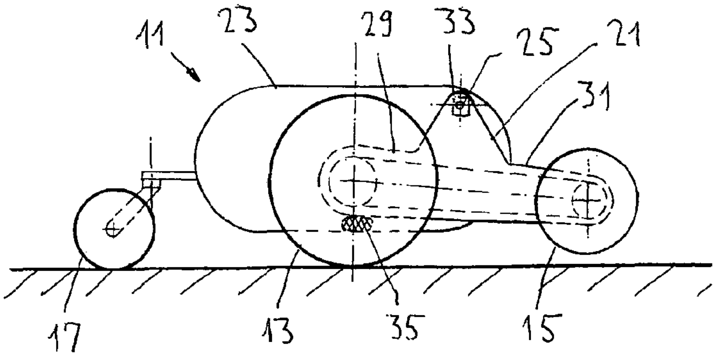
FIG. 4 is a schematic illustration of a second embodiment of the chassis.

As may be seen in particular from FIG. 3, the chassis 11 has a front part 21 and a rear part 23 which are connected to each other in an articulated manner by means of a joint 25. The central wheels 13 can be motor-driven separately from each other by a respective motor 27 (only one is visible in FIG. 1). The front wheels 15 are also motor-drivable. This greatly improves the cross-country mobility of the vehicle. However, the key thing is that the front wheels 15 are also driven separately from each other. When, therefore, the front wheels 15 are rotated, when the user is in the standing position, in mutually opposite directions, the user is pivoted about his own axis. This makes it easier for the user to carry out activities while standing up.

As may be seen in particular from FIG. 3, the front part 21 forms a two-armed lever. The central wheels 13 are arranged on one arm 29 and the front wheels 15 are arranged on the other arm 31. Spring means 33, for example a coil spring or a spring joint element, bias the two-armed lever 21 against a stop 35, which may be made of elastomeric material, on the rear part 23 in order to hold the front wheels 15 normally out of contact with the ground when travelling on a flat carriageway. During relatively sharp braking, the front wheels 15 can enter into contact with the carriageway and cooperate in the braking process. In this case, the two-armed lever 21 is spring-mounted by the spring 33, so that the user does not sense any impact.

Figure 6:
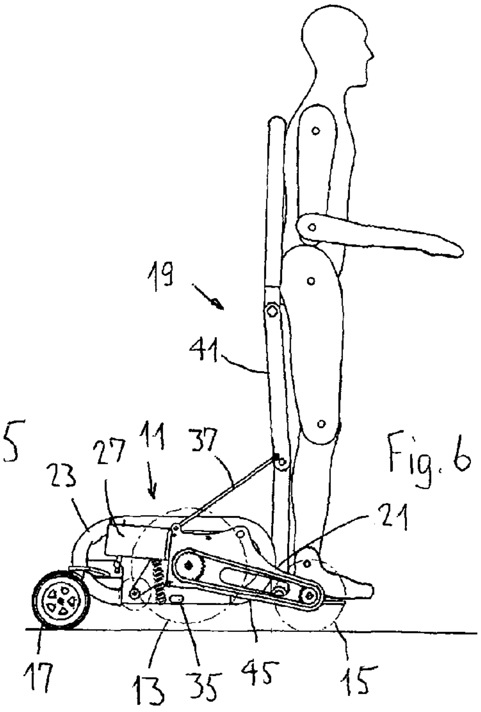
FIG. 6 shows the stand-up wheelchair from FIGS. 1 and 5 in the standing position.
Figure 7:
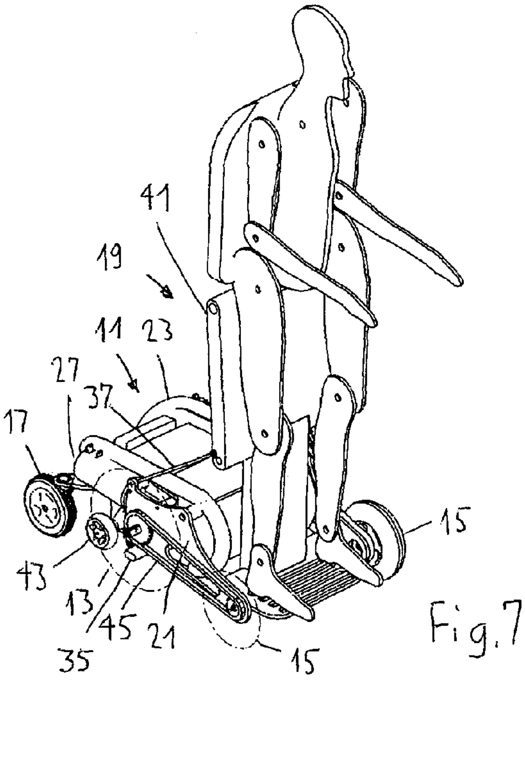
FIG. 7 shows the stand-up wheelchair as in FIG. 6, but in a perspective illustration.

The front wheels 15 are brought into contact with the ground by drive means during the transition from the sitting position (FIGS. 1 and 5) to the standing position (FIGS. 6 and 7). A pull rod or a cable pull, which connects the seat 41 to the arm 29 of the two-armed lever 21, serves as the drive means 37. This solution has the advantage that the seat exerts a tensile force on the pull rod 37 during standing-up and as a result brings the front wheels 15 into contact with the ground without the need for a particular motor. However, in a wheelchair or other vehicle without a stand-up function, motor drive means 37' (FIG. 2), for example a linear motor, can be provided in order to bring the front wheels 15 into or out of contact with the ground as required. It is however also possible to provide a linear motor 37' in a stand-up wheelchair so that the front wheels 15 can be brought into contact with the ground even in the sitting position.

FIG. 7 shows that the footrest 48 can have generous dimensions because the front wheels 15 are not in the form of pivot wheels.

Figure 2:
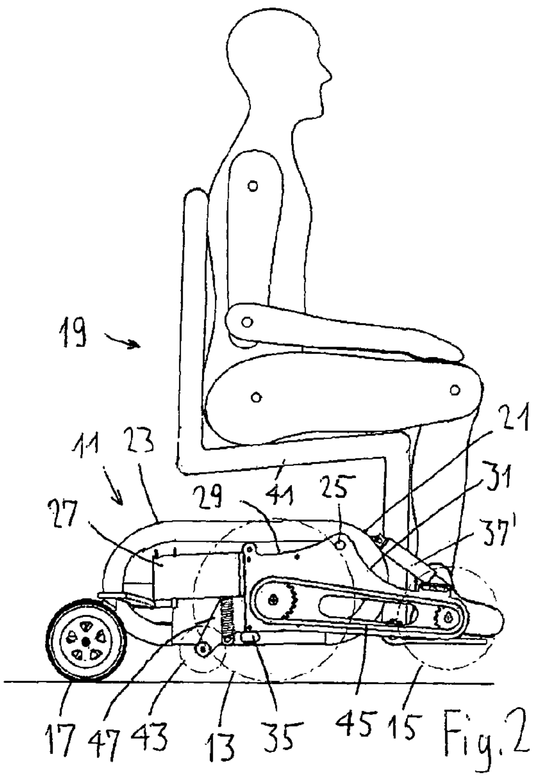
FIG. 2 shows a wheelchair.

The motor 27 is provided for driving the central wheel 13, the front wheel 15 and if appropriate an auxiliary wheel 43 of each side of the vehicle. The central wheel 13 and the front wheel 15 are operatively connected to each other by an endless chain 45. Furthermore, the central wheel 13 and if appropriate the auxiliary wheel 43 are operatively connected to each other by an endless chain. 47 (FIG. 2). The use of endless toothed belts, toothed gearings, cardan shafts or other devices would also be possible.

Figure 8:
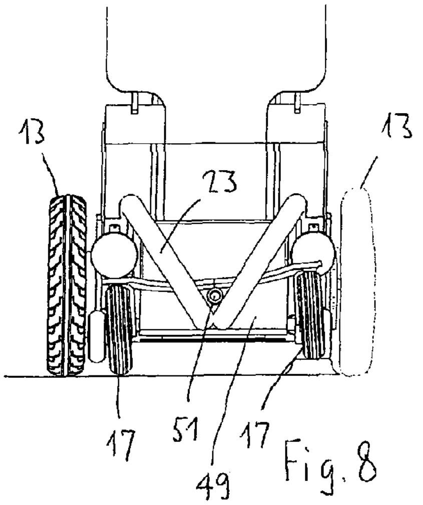
FIG. 8 shows the wheelchair or stand-up wheelchair viewed from behind.

As FIG. 8 shows, two rear wheels 17, which are pivotable about a central pivot axis 15, are advantageously arranged on a rocker 49. A spring joint element, for example of the ROSTA, can serve as the pivot axis 51.

Figure 9:
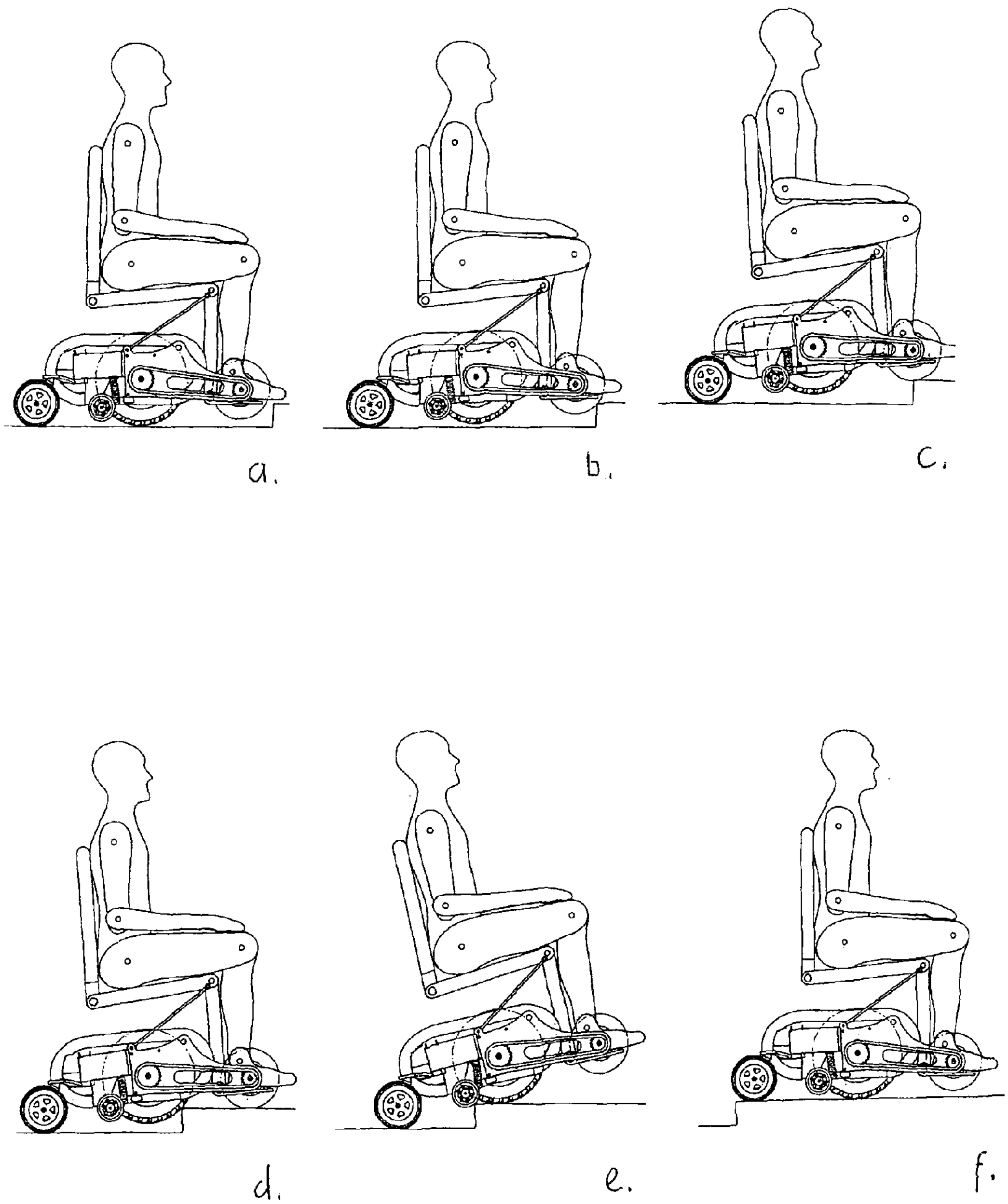
FIG. 9 shows various phases of the surmounting of an obstacle.

The user of the vehicle is able to surmount relatively large obstacles, even at low speed. FIG. 9 shows the various phases of the surmounting of an obstacle.

a) The vehicle approaches the obstacle with central and front wheels being driven.

b) The vehicle climbs onto the obstacle with front wheels being driven, the central wheels being raised from the ground if the rear wheels are not spring-mounted.

c) The front wheels have surmounted the obstacle.

d) The vehicle climbs onto the obstacle with the central wheels being driven.

e) The central wheels have surmounted the obstacle. If an auxiliary wheel is present, the vehicle is tilted forward and allows in this way the subsequent pivot wheels to travel over the obstacle.

f) The vehicle has surmounted the obstacle.

Figure 10:
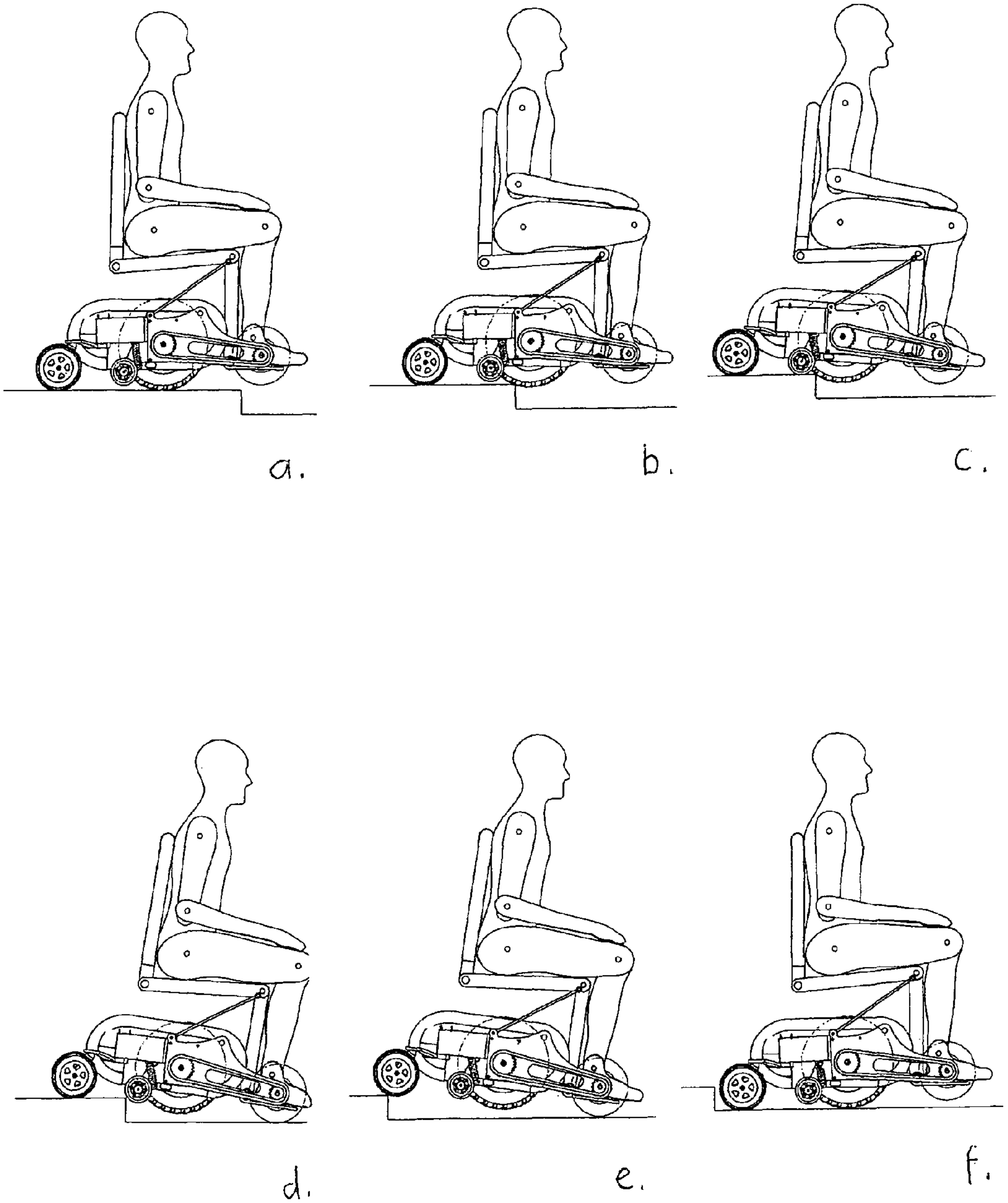
FIG. 10 shows various phases when descending over an edge of a kerb.

FIG. 10 shows the various phases when descending from an obstacle.

a) The vehicle is in a position in which the front wheels protrude beyond the edge of a kerb.

b) The central wheels descend from the edge of the kerb.

c) If an auxiliary wheel is present, the auxiliary wheel briefly enters into contact with the ground.

d) The vehicle travels with the auxiliary wheel over the edge of the kerb even without the auxiliary wheel being driven, since the front wheels ensure the drive.

e) The vehicle travels with the rear wheels over the edge of the kerb. If the rear wheels are spring-mounted, the central wheels can already enter into contact with the ground.

f) The vehicle has travelled over the edge of the kerb. The front wheels are no longer in contact with the ground.

In summary, the following may be stated:

The vehicle, for example a wheelchair or a stand-up wheelchair, has a chassis 11 and a seat device 19 arranged thereon. On each side of the chassis 11, the central wheel 13, which can be driven by a motor 27, and the front wheel 15 are operatively connected to each other via an endless chain 45. The chassis 11 has a front part 21 and a rear part 23 which are connected to each other in an articulated manner by means of a joint 25. In the sitting position, the front wheels 15 are not in contact with the ground, so that they do not obstruct turning of the vehicle in a narrow space. In the standing position, the front wheels 15, but not the central wheels 13, are in contact with the ground. The user can therefore rotate, when standing up, with the vehicle about his or her own axis without the central wheels 13 having a blocking effect.

The invention claimed is:

1. A wheelchair with central wheel drive, comprising:

a chassis and a seat device arranged on the chassis, the chassis having a front part and a rear part which are connected to each other in an articulated manner by a joint, and two central wheels which can be motor-driven separately from each other, two front wheels and at least one rear wheel, the front wheels capable of being motor-driven separately from each other and at least one drive allowing the front part of the chassis to be adjusted in relation to the rear part in order to bring the two central wheels out of contact with the ground and the front wheels into contact with the ground.

2. The wheelchair according to claim 1, wherein the front part forms a two-armed lever, the central wheels being arranged on one arm and the front wheels being arranged on the other arm.

3. The wheelchair according to claim 2, further comprising a spring means for biasing the front part against a stop on the rear part in order to hold the front wheels normally out of contact with the ground.

4. The wheelchair according to one of claim 1, further comprising an auxiliary wheel after the central wheel.

5. The wheelchair according to one of claim 1, further comprising a common motor drive for the central wheel, the front wheel and an auxiliary wheel of each side of a wheelchair.

6. The wheelchair according to claim 5, wherein the central wheel, the front wheel and the auxiliary wheel are operatively connected via at least one of an endless chain, an endless toothed belt, a toothed gearing, or a cardan shaft.

7. The wheelchair according to claim 1, wherein the rear wheel is spring-mounted.

8. The wheelchair according to claim 1, wherein two rear wheels are provided and in that the two rear wheels are arranged on a rocker which is pivotable about a central pivot axis.

9. The wheelchair according to claim 8, wherein a spring joint element serves as the pivot axis.

10. The wheelchair according to claim 1, further comprising a motor that can be actuated by the user and that serves as the drive for adjusting the front part.

11. The wheelchair according to claim 1, further comprising a stand-up mechanism for the seat device and means for moving the stand-up mechanism from the sitting position to the standing position and from the standing position to the sitting position and wherein the seat device is coupled to the front part of the chassis by a connecting means for bringing the front wheels into contact with the ground during the transition from the sitting position to the standing position.

12. The wheelchair according to claim 11, wherein the connecting means further comprises at least one of a pull rod or a cable pull, which connects the seat to the arm of the two-armed lever.

* * * * *